United States Patent

[11] 3,601,028

| [72] | Inventor | Everett A. Tertocha<br>Burbank, Calif. |
|---|---|---|
| [21] | Appl. No. | 10,833 |
| [22] | Filed | Feb. 12, 1970 |
| [45] | Patented | Aug. 24, 1971 |
| [73] | Assignee | The United States of America as represented by the Secretary of the Navy |

[54] CAMERA TRIPOD
5 Claims, 5 Drawing Figs.

[52] U.S. Cl. .................................................. 95/86, 95/11
[51] Int. Cl. ................................................. G03b 17/56
[50] Field of Search .......................................... 95/11, 86

[56] References Cited
UNITED STATES PATENTS

| 2,198,920 | 4/1940 | Robinson | 95/86 |
| 2,219,169 | 10/1940 | Alter | 95/86 |
| 2,275,687 | 3/1942 | Schubert | 95/86 |

*Primary Examiner*—Samuel S. Matthews
*Assistant Examiner*—D. J. Clement
*Attorneys*—Richard S. Sciascia, Q. Baxter Warner and Gayward N. Mann

ABSTRACT: A stationary baseplate having a large centralized opening therein and supported by three spaced leg members. A camera ring with a camera mounting block positioned on one edge thereof is rotatably mounted on the upper surface of the baseplate and encompasses the centralized opening therein. This camera mounting device is adapted to position a camera so as to focus on an object through the baseplate opening. It permits accurate photography without any blurring, yet is instantly removable to permit other functions.

Patented Aug. 24, 1971
3,601,028
2 Sheets-Sheet 1
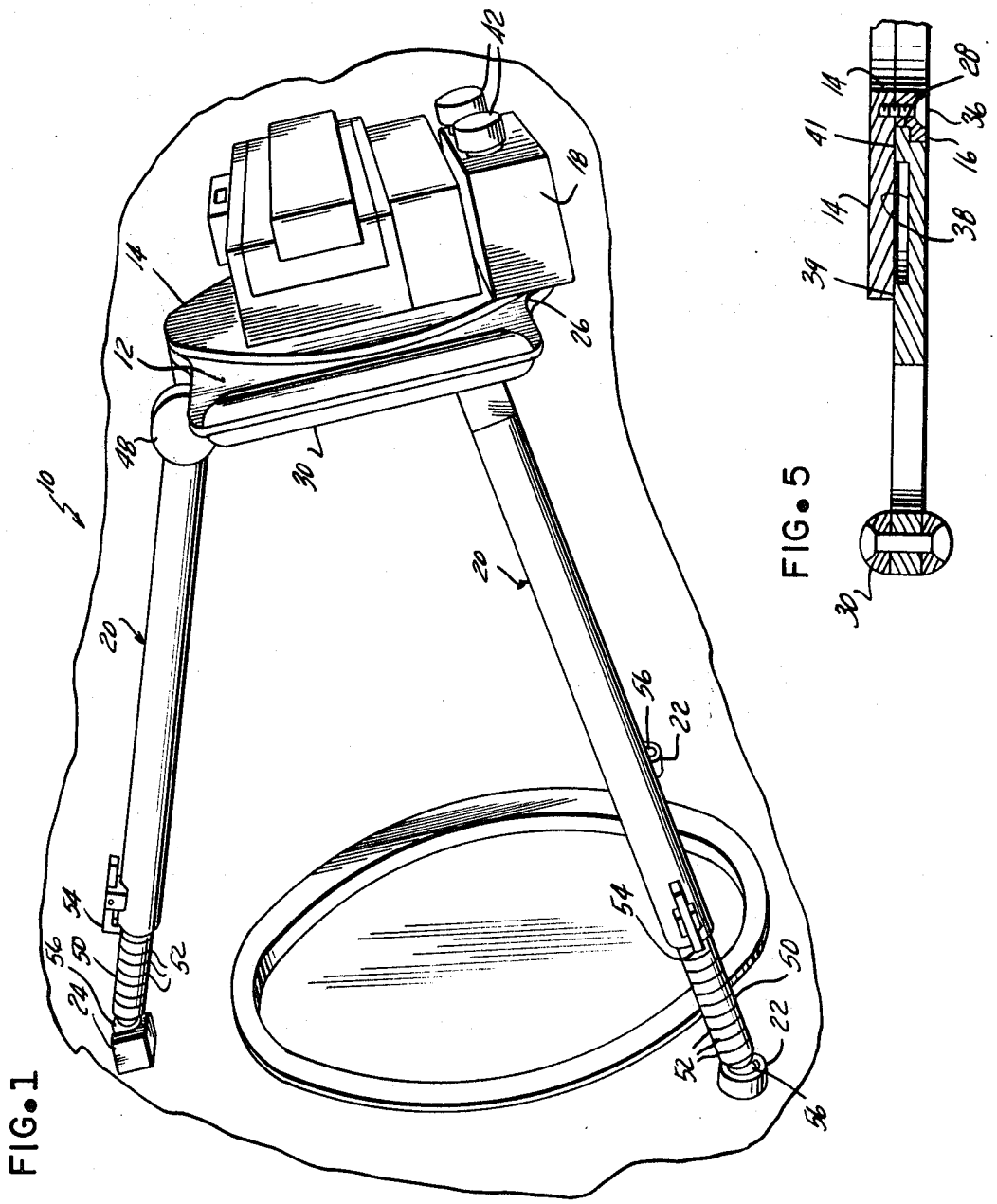
EVERETT A. TERTOCHA
INVENTOR.
BY Gayward N. Mann
Q. Baxter Warner.
Attorney

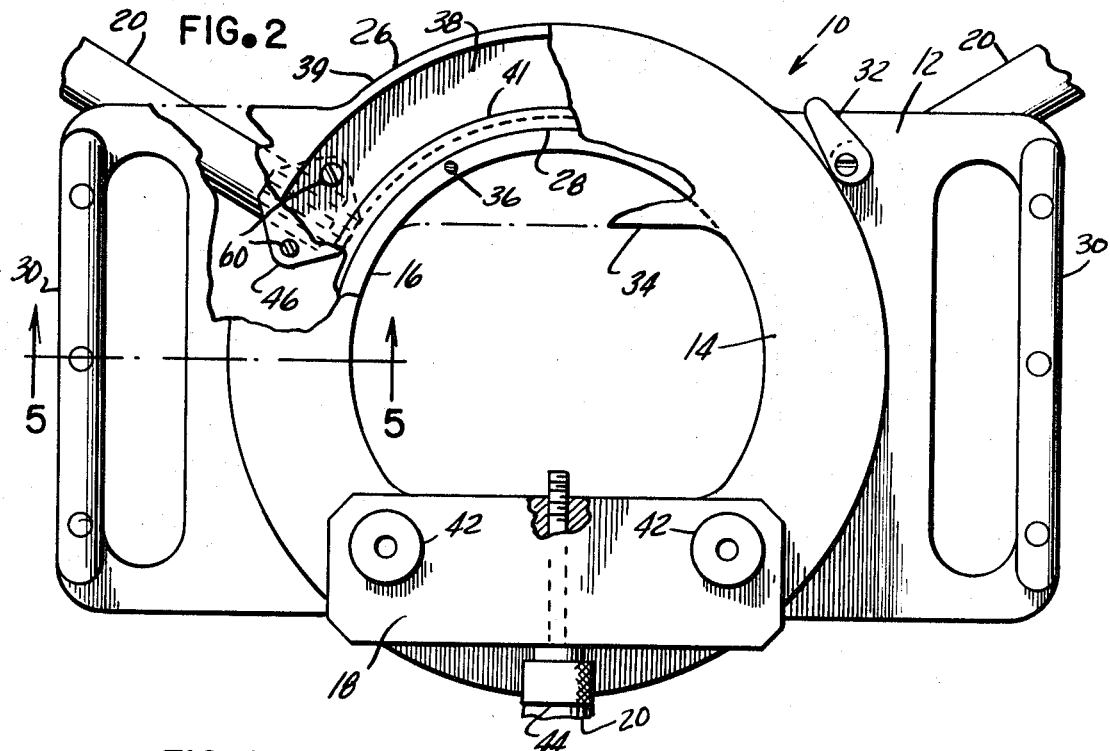
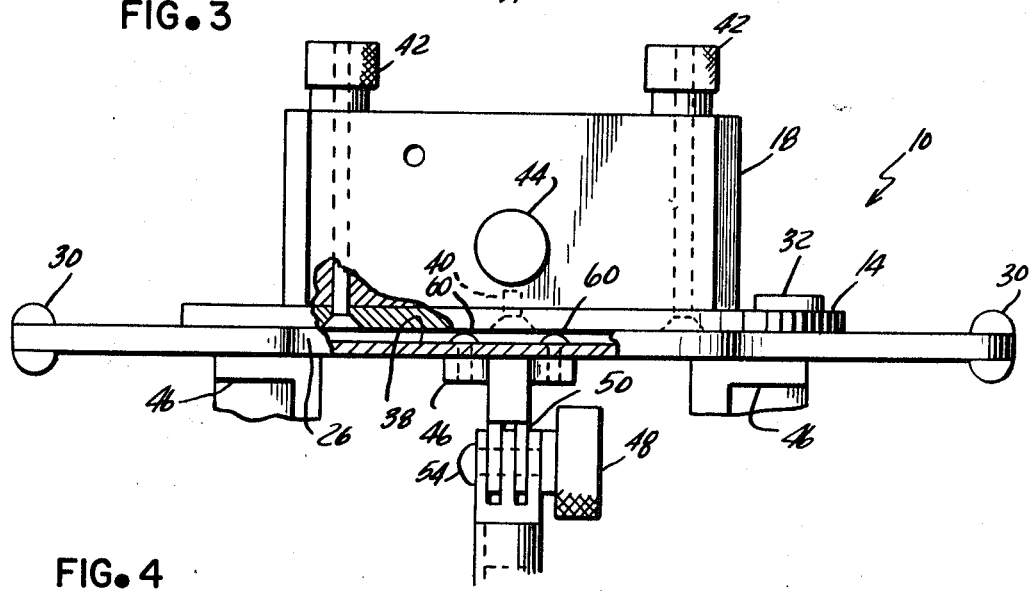
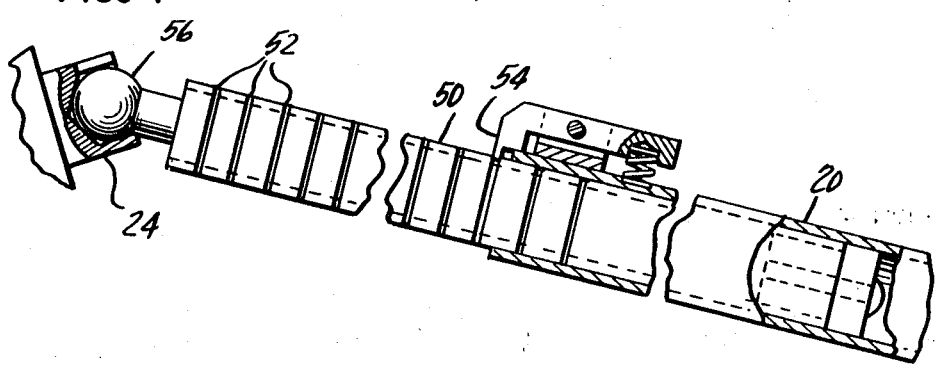

CAMERA TRIPOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to camera mounting devices and more particularly to a tripod arrangement adapted to hold a camera within an aircraft in a manner suitable for quality picture taking.

2. Description of the Prior Art

Camera mounting devices of various and sundry types are well known in the art. Most, however, are bulky, cumbersome, heavy and difficult to operate, particularly when employed in aircraft. Moreover pictures obtained from cameras mounted on many prior art devices may be of such poor quality due to lack of rigidity of the mount and resulting camera movement as to render them ineffective. The present camera mount obviates such defects and allows clear unblurred pictures to be obtained from a variety of cameras mounted thereon.

SUMMARY

A camera tripod utilized in aircraft and adaptable as a mounting means for various cameras employed primarily in photographing instrumentation information. The tripod comprises a baseplate having a large centralized opening and supported by three adjustable legs. A camera support ring encompasses the baseplate opening and is rotatably secured in place. It has a camera mounting block thereon to which may be secured any of a number of different type cameras. The tripod legs are designed to be supported on bezel mounts from which they may be instantly detached when required. The entire assembly collapses into a compact flat package for storage.

STATEMENT OF THE OBJECTS OF INVENTION

Accordingly an object of the invention is to provide a camera tripod capable of mounting numerous cameras thereon in a manner suitable for quality picture taking and which may be collapsed into a small space for storage.

Another object of the invention is to provide a camera tripod mounting device which predetermines the focusing and positioning of the camera.

A further object of the invention is to provide a camera tripod mounting device which is easily and quickly removed to permit other necessary functions.

A still further object of the invention is to provide a camera mounting device which is economical to manufacture and simple in operation.

Other objects, advantages and novel features of the invention will become apparent from the following detailed description of the invention when considered in conjunction with the accompanying drawings.

BRIEF DESCRIPTION OF THE DRAWINGS

FIG. 1 is a perspective view of one embodiment of the camera tripod in use.

FIG. 2 is a top plan view of the assembled mounting device.

FIG. 3 is a side elevation of the device of FIG. 2 with a portion broken away.

FIG. 4 is a view of a tripod leg member, partially in section, showing the telescoped extension and clip.

FIG. 5 is a sectional view along the line 5—5 in FIG. 2.

DESCRIPTION OF THE PREFERRED EMBODIMENT

The camera tripod mounting unit 10 of the present invention includes generally a rectangular shaped baseplate 12 having a large central opening 28 with a circular and rotatable camera ring 14 positioned immediately above the baseplate and secured thereto by clamp ring 16. A camera mounting block 18 is located on the upper surface of the camera ring and is adapted to position a camera so as to focus on an object through baseplate opening 28. A series of three adjustable legs 20 are conventionally mounted in spaced relationship about the bottom periphery of baseplate 12 with each leg being positioned in either side bezel mount sockets 22 or top bezel mount socket 24. Each socket is designed to release instantly the entire camera tripod in the event of an emergency.

The baseplate 12 has an expanded central portion 26 in which the aforementioned large central opening 28 is located. A pair of handles 30 are suitably attached to each end of the baseplate 12 substantially as shown in FIG. 5. A camera ring lock cam 32 is mounted on the upper surface of the baseplate and is adapted to selectively bind against and lock the rotatable camera ring in any desired position. If a different position is required, the cam is released, moved to an unlocked position, and then reset again in the new position. As shown best in FIG. 5, a wide circular baseplate groove 38 is cut into the top surface of the baseplate central portion 26 forming land surfaces 39 and 41 which help to reduce friction between the moving surfaces when the camera ring 14 is rotated thereon. Groove 38 also provides clearance for the protruding heads of the leg mount securing screws 60.

The camera ring 14 has a camera ring opening 34 axially aligned with baseplate opening 28. The clamp ring 16 is inset into a receptive portion in the bottom of the baseplate 12 at the periphery of opening 28. It is attached to the under surface of camera ring 14 by clamp ring securing screws 36. A camera mounting block 18 is located on one side of the upper surface of camera ring 14 and is held in position by a mounting block pivot screw 40. A pair of top mounting block adjustment lock screws 42 located on the top portion of camera mounting block 18 and a side-mounting block adjustment lock screw 44 located on the front face thereof all allow adequate adjustments for any of the variety of cameras which may be positioned on such mounting block. It is to be noted as shown in FIG. 1 that the thus mounted camera may be focused on an intended subject, such as the scopes of an aircraft instrument, through the aligned openings 28 and 34 respectively, of both the baseplate 12 and the camera ring 14.

Attached to the bottom periphery of the baseplate 12 by leg mount securing screws 60 are three equally spaced leg pivotal mounts 46 with lock knobs 48 by which they may be secured in any adjusted position.

Telescoped within the leg 20 is an eccentrically shaped leg shank 50 having equally spaced peripheral grooves 52 one above the other into which a conventional spring-biased leg extension lock clip 54 will fit. Although the clip 54 is mounted on the end of each leg 20, it is adapted to bind against the leg shank 50 in a manner as shown substantially in FIG. 4. Thus if a leg is to be lengthened, the clip 54 is lifted from the leg shank 50 in a conventional manner and said shank is then pulled from its telescoped location within leg 20 to a desired length. The clip 54 is then released to fit into the correct groove 52. The eccentric shape of each leg shank 50 prevents unnecessary and undesirable movement within the leg 20.

Mounted at the lower end of each leg shank 50 is a ball-shaped foot 56 which is adapted to fit into one of the bezel mount sockets 22 or 24 prepositioned in a proper location within the aircraft and about the object which is to be photographed. It will be noted as shown in FIG. 1 that side bezel mounts 22 are sockets in which a pair of foot elements 56 are placed, whereas upper bezel mount 24 is a slotted socket in which the remaining tripod foot 56 is inserted.

Thus the tripod 10 above described permits the use of a whole host of cameras thereon with a variety of different sized film. The tripod positioned in the bezel mounts permits steady unblurred photography and yet is substantially instantly removable to perform other functions or if an emergency occurs.

Obviously many modifications and variations of the present invention are possible in the light of the above teachings. It is therefore to be understood that within the scope of the appended claims the invention may be practiced otherwise than as specifically described.

1. A quick detachable camera mount especially adapted for photographing an aircraft instrument panel comprising:
 a baseplate member having a large central opening through which said instrument panel may be photographed,
 a camera ring rotatably mounted on one side of said baseplate member and encompassing said opening therein, said camera ring adapted to suitably mount a camera thereon,
 a retaining ring positioned on the opposite side of said baseplate member and similarly encompassing said baseplate opening, said retaining ring being secured to the camera ring to maintain the ring and base member in assembled relationship,
 a series of at least three leg members mounted on one side of said baseplate member and adapted to space the mounted camera a selected distance from the object to be photographed, and
 a series of tripod foot receiving bezel mounts for each of said leg members mounted on the baseplate in which said legs are positioned during use of the mount, said mounts being located on the instrument panel adjacent the particular instruments to be photographed,
 thus a sturdy camera mount is provided upon which a variety of cameras may be mounted for clear photography yet is instantly removable in an emergency situation.

2. The camera mount as defined in claim 1 wherein:
 a camera mounting block is located on one side of said camera ring and is adapted to mount a camera so as to photograph an object through the central opening of the baseplate.

3. The camera mount as defined in claim 2 wherein:
 said retaining ring is inset in the baseplate member at the periphery of the central opening therein.

4. The camera mount as defined in claim 2 wherein:
 the leg members each have telescoped therein a leg extension, with
 a clip mounted on each of said leg members and adapted to hold each respective leg extension in a selected extended position.

5. The camera mount as defined in claim 4 wherein:
 said bezel mounts are so designed as to hold the extended leg extensions in a rigid manner but which are adapted to instantly release the entire camera mount if an emergency develops.